US012446140B2

(12) United States Patent
Cappadona et al.

(10) Patent No.: US 12,446,140 B2
(45) Date of Patent: Oct. 14, 2025

(54) GROUNDED MATTRESS

(71) Applicant: Carico International, LLC, Fort Lauderdale, FL (US)

(72) Inventors: Richard R Cappadona, Boca Raton, FL (US); Igor Zunkovic, Dubai (AE)

(73) Assignee: Carico International, LLC, Fort Lauderdale, FL (US)

( * ) Notice: Subject to any disclaimer, the term of this patent is extended or adjusted under 35 U.S.C. 154(b) by 462 days.

(21) Appl. No.: 17/715,990

(22) Filed: Apr. 8, 2022

(65) Prior Publication Data

US 2023/0217578 A1 Jul. 6, 2023

Related U.S. Application Data

(60) Provisional application No. 63/296,519, filed on Jan. 5, 2022.

(51) Int. Cl.
*H05F 3/02* (2006.01)
*A47C 19/12* (2006.01)
(Continued)

(52) U.S. Cl.
CPC ............. *H05F 3/02* (2013.01); *A47C 27/002* (2013.01); *A47C 19/126* (2013.01); *A47C 23/00* (2013.01);
(Continued)

(58) Field of Classification Search
CPC ........ A47C 27/14; A47C 27/00; A47C 27/001; A47C 27/002; A47C 27/003;
(Continued)

(56) References Cited

U.S. PATENT DOCUMENTS 3,806,959 A * 4/1974 Gross ..................... D04B 21/16 297/DIG. 5
4,307,144 A * 12/1981 Sanders .................. B32B 5/245 428/522

(Continued)

OTHER PUBLICATIONS

International Search Report and Written Opinion dated Apr. 25, 2023 for International Application No. PCT/US2023/60060 filed on Jan. 4, 2023, consisting of 7 pages.

*Primary Examiner* — Matthew Troutman
*Assistant Examiner* — Morgan J Mcclure
(74) *Attorney, Agent, or Firm* — Weisberg I.P. Law, P.A.

(57) ABSTRACT

Systems and methods are provided for grounding a person lying on a mattress. Such grounding may connect a user's body to the earth and enable electrical discharge off the human body. The systems and methods may include a mattress pad having conductive inner and outer layers. The mattress pad may also include an insulating interior layer having a flame-retardant layer, a first foam layer, and a second foam layer. The mattress pad may also include a conductive edge ribbon configured to electrically couple the inner and outer layers, as well as a grounding terminal. A grounding cable may be realized to ground the inner layer, outer layer, and conductive edge ribbon. The grounded mattress then grounds the human body, allowing it to get closer to a natural electrical potential. This can reduce static electricity, static shocks and enhance quality sleep. The mattress will also improve shielding from electromagnetic fields (EMFs).

20 Claims, 10 Drawing Sheets

(51) Int. Cl.
*A47C 23/00* (2006.01)
*A47C 27/00* (2006.01)
*A47C 27/12* (2006.01)
*A47C 27/15* (2006.01)
*A47C 31/00* (2006.01)

(52) U.S. Cl.
CPC ............ *A47C 27/00* (2013.01); *A47C 27/001* (2013.01); *A47C 27/122* (2013.01); *A47C 27/15* (2013.01); *A47C 31/001* (2013.01); *A47C 31/004* (2013.01); *A47C 31/007* (2013.01)

(58) Field of Classification Search
CPC ..... A47C 27/005; A47C 27/12; A47C 27/127; A47C 27/125; A47C 27/124; A47C 27/122; A47C 27/121; A47C 27/15; A47C 27/148; A47C 27/142; A47C 27/144; A47C 27/14616; A47C 27/22; A47C 27/20; A47C 27/04; A47C 27/05; A47C 27/053; A47C 27/056; A47C 19/126; A47C 23/00; A47C 31/001; A47C 31/004; A47C 31/006; A47C 31/007; A47C 31/105; A47D 7/002; A47D 13/063; A47D 13/066; H05F 3/02
See application file for complete search history.

(56) References Cited

U.S. PATENT DOCUMENTS 4,415,946 A 11/1983 Pitts
4,472,471 A * 9/1984 Klein ...................... B32B 27/08 428/172
4,606,290 A * 8/1986 Marzotto ............. A47C 31/105 5/500
4,630,867 A * 12/1986 Gulliver ............... A47C 31/004 297/452.55
4,663,516 A * 5/1987 Blum ...................... A61F 7/007 219/217
5,173,531 A 12/1992 Kissel
5,325,553 A 7/1994 Ripley et al.
5,400,448 A 3/1995 Zwickey
5,406,660 A 4/1995 Johenning
5,414,882 A 5/1995 Goodale
5,416,936 A 5/1995 Chan
5,432,964 A * 7/1995 Strell ..................... A47C 27/05 5/721
5,435,026 A 7/1995 Cavazos
5,459,894 A 10/1995 Buonocore
5,471,687 A 12/1995 Vierra
5,475,881 A * 12/1995 Higgins ............... A47C 31/105 5/737
5,488,746 A 2/1996 Hudson
5,499,410 A 3/1996 Assink
5,513,400 A 5/1996 Turner
5,525,411 A * 6/1996 Stewart ................ B60N 2/5866 442/56
5,553,339 A 9/1996 Thomas
5,557,813 A 9/1996 Steed et al.
5,561,876 A 10/1996 Petruzella
5,564,141 A 10/1996 Anderson
5,568,663 A 10/1996 Brown
5,644,811 A * 7/1997 Cavazos .............. A47C 31/105 5/721
5,666,680 A 9/1997 Hackett, Jr.
5,675,854 A 10/1997 Zibelin
5,768,726 A 6/1998 Myles
5,802,646 A 9/1998 Stolpmann et al.
5,815,865 A 10/1998 Washburn et al.
5,857,232 A 1/1999 Mahdavi
5,860,174 A 1/1999 Failor
5,896,605 A 4/1999 Branman
5,910,081 A 6/1999 Graham
6,023,955 A 2/2000 Grondahl
6,038,722 A 3/2000 Giori et al.
6,052,853 A 4/2000 Schmid
6,055,689 A 5/2000 Cavazos
6,101,653 A 8/2000 England
6,161,231 A 12/2000 Kraft et al.
6,174,584 B1 1/2001 Keller et al.
6,178,578 B1 1/2001 Soltani et al.
6,243,894 B1 6/2001 Kosumsuppamala et al.
6,263,532 B1 * 7/2001 Miller .................. A47C 31/105 5/737
6,295,676 B1 10/2001 Warner
6,321,400 B1 11/2001 Gulino
6,343,394 B1 2/2002 Gandolfi
6,351,862 B1 3/2002 Henley et al.
6,370,718 B1 4/2002 Schmid
6,430,763 B2 8/2002 Kosumsuppamala et al.
6,446,289 B1 9/2002 Su et al.
6,493,888 B1 12/2002 Salvatini et al.
6,516,481 B1 * 2/2003 Erickson .............. A47C 27/144 5/724
6,596,018 B2 7/2003 Endo et al.
6,611,974 B2 9/2003 Roit et al.
6,618,880 B1 9/2003 Chase
6,626,820 B1 * 9/2003 Ardizzone ............... A61N 2/06 600/15
6,631,529 B1 * 10/2003 Erickson .............. A47G 9/0246 5/500
6,634,042 B2 10/2003 Blossman
6,665,893 B2 12/2003 Frugé
6,683,779 B2 1/2004 Ober
6,684,432 B2 2/2004 Owens, Jr.
6,735,923 B1 5/2004 Resta
6,745,420 B2 6/2004 Giori et al.
6,757,923 B2 7/2004 Sopher et al.
6,804,848 B1 10/2004 Rose
6,823,548 B2 11/2004 Murphy et al.
6,854,143 B2 2/2005 Sharples
6,857,142 B2 2/2005 Frugé
6,922,863 B2 8/2005 Giori et al.
6,925,775 B1 8/2005 Smallwood, Sr.
6,954,957 B2 10/2005 Metzger et al.
6,971,133 B2 12/2005 See
6,990,701 B1 1/2006 Litvak
7,007,329 B2 3/2006 Metzger
7,013,515 B1 3/2006 Price
7,017,205 B2 3/2006 Gladney
7,047,580 B2 5/2006 Finn
8,209,804 B2 7/2012 Apperson et al.
9,167,909 B2 10/2015 Cappadona et al.
10,842,704 B1 * 11/2020 Hays .................... A47C 31/007
2002/0027761 A1 3/2002 Ober
2004/0242108 A1 12/2004 Russell et al.
2007/0234479 A1 * 10/2007 Warshaver ........... A47C 31/105 5/690
2009/0308404 A1 * 12/2009 Leonard ................. D03D 15/37 128/889
2012/0110734 A1 5/2012 An
2012/0198618 A1 * 8/2012 Pavletic ................. A47G 9/007 5/499
2013/0082723 A1 4/2013 Locke
2014/0259398 A1 * 9/2014 Kendall ............. A47G 27/0237 5/420
2015/0182032 A1 * 7/2015 Jensen ................. A47C 31/105 5/699
2015/0265063 A1 * 9/2015 Cappadona .......... A47C 27/148 5/724
2017/0000271 A1 * 1/2017 Baxter ..................... H01B 1/04
2018/0078047 A1 * 3/2018 Patel ......................... E05G 1/10
2018/0235375 A1 * 8/2018 Garcia ................... A47C 27/00
2023/0218092 A1 * 7/2023 Jiménez Castillo . A47C 31/005 5/740

* cited by examiner

GROUNDED MATTRESS

CROSS-REFERENCE TO RELATED APPLICATIONS

This application claims priority to U.S. Provisional Application No. 63/296,519, filed Jan. 5, 2022, which is incorporated herein by reference in its entirety.

TECHNICAL FIELD

The present disclosure relates to a grounded bed mattress or mattress pad.

BACKGROUND

A mattress is a cushioning device that typically overlies a bed frame or box spring and supports a person who is lying on the mattress. A mattress can also be used without a bed frame or without a box spring. A mattress pad is a cushioning device that is typically placed on top of a mattress.

SUMMARY

An example mattress pad of the present disclosure comprises a top panel that includes an electrically conductive inner layer that includes a plurality of first conductive threads that are woven in two differing and intersecting directions. The top panel may also include an electrically conductive, antibacterial outer layer that includes a plurality of second conductive threads that are aligned substantially parallel to one another. Alternatively, the plurality of second conductive threads may be aligned in differing and intersecting directions. In some embodiments, the top panel also includes a conductive edge ribbon that is electrically coupled to the inner conductive layer and the outer conductive layer. In some embodiments, the conductive material is silver or carbon fibers. The mattress pad may further include a grounding terminal and a grounding cable that is configured to electrically ground the inner conductive layer, the outer conductive layer, and the conductive edge ribbon.

In some embodiments, the insulating interior layer of the top panel includes a flame-retardant layer, a first foam layer, and a second foam layer. The grounding cable of the mattress pad may include a first end that is connectable to and detachable from the grounding terminal and a second end that is configured to electrically couple the grounding terminal to earth ground. The second end may be coupled to an adapter configured to plug into an electrical wall outlet. In some embodiments of the present disclosure, the conductive edge ribbon comprises conductive material that is interwoven in a pattern of intersecting and substantially straight lines.

The present disclosure also describes a mattress including a foam inner portion, a top panel, a grounding terminal, and a grounding cable. The top panel may be coupled to a top side of the foam inner portion and may include an electrically conductive first inner layer comprising a plurality of conductive threads woven in two differing and intersecting directions. The top panel may also include an electrically conductive, antibacterial first outer layer comprising a plurality of conductive threads aligned substantially parallel to one another. Alternatively, the plurality of conductive threads of the first outer layer may be woven in two differing and intersecting directions. In some embodiments, the mattress of the present disclosure also includes a first insulating interior layer located between the first inner layer and the first outer layer and a conductive edge ribbon that is electrically coupled to the first inner layer and the first outer layer. The grounding terminal may be electrically coupled to the mattress encasement and the grounding cable may be configured to electrically ground the inner layers, the outer layers, and the conductive edge ribbon, in some embodiments.

In some embodiments, the mattress further comprises a mattress encasement configured to surround the foam inner portion that includes the top panel and a side panel that is electrically coupled to the top panel. In some embodiments, the side panel includes an electrically conductive second inner layer comprising a plurality of conductive threads woven in two differing and intersecting directions and an electrically conductive, antibacterial second outer layer comprising a plurality of conductive threads aligned substantially parallel to one another. In other embodiments, the second outer layer comprises a plurality of conductive threads woven in two differing and intersecting directions. The side panel may also include a second conductive edge ribbon that is electrically coupled to the second inner layer and the second outer layer. The mattress may also include a mechanical fastener configured to electrically couple the top and side panels. The side panel may also include a second insulating interior layer located between the second inner layer and the second outer layer that includes a flame-retardant layer and a polyester layer.

The mattress encasement may further include a bottom panel coupled to a bottom side of the foam inner portion that includes an electrically conductive third inner layer comprising a plurality of conductive threads woven in two differing and intersecting directions. The bottom panel may also include an electrically conductive, antibacterial third outer layer comprising a plurality of conductive threads aligned substantially parallel to one another, and a third insulating interior layer. In some embodiments, the third outer layer comprises a plurality of conductive threads woven in two differing and intersecting directions. In some embodiments, the top, side, and bottom panels are electrically coupled to one another. In some embodiments, the bottom panel includes a third conductive edge ribbon coupling the third inner layer to the third outer layer, and the bottom panel is electrically coupled to the side panel via a second mechanical fastener. In other embodiments, the third inner and third outer layers of the bottom panel are electrically coupled to the second inner and second outer layers of the bottom panel via the second conductive edge ribbon. The foam inner portion of the mattress may include a first foam layer having a first density and a second foam layer coupled to the first foam layer in which the first and second foam layers have different densities. The insulating interior layer of the top panel may include a flame-retardant layer, a first foam layer, and a second foam layer. The insulating interior layer of the bottom panel may include a flame-retardant layer and a polyester layer.

The grounding cable may include a first end that is connectable to and detachable from the grounding terminal and a second end that is configured to electrically couple the grounding terminal to earth ground. In some embodiments, this second end is coupled to an adapter that is configured to plug into an electrical wall outlet. In other embodiments, the second end is configured to attach to a rod driven into the earth. The conductive edge ribbon may include conductive material that is interwoven in a pattern of intersecting and substantially straight lines. The conductive material of the conductive edge ribbon may be silver or carbon fibers. In the example mattress described herein, the top, bottom, and side panels may be electrically coupled to one another via one or more of the first, second, or third conductive edge ribbons.

The present disclosure also describes a method of electrical grounding. In some embodiments, the method includes a first step of physically contacting an electrically conductive, antibacterial outer layer of a top panel of a mattress pad. A second step of the method may be electrically coupling the outer layer of the top panel of the mattress pad to an electrically conductive inner layer of the top panel of the mattress pad. A third step of the method may be electrically coupling the outer layer of the top panel and the inner layer of the top panel to a conductive edge ribbon. A fourth step of the method may be electrically coupling the outer layer of the top panel, the inner layer of the top panel, and the conductive edge ribbon to earth ground. The method of the present disclosure may further include electrically coupling the outer layer of the top panel, the inner layer of the top panel, and the conductive edge ribbon to an outer layer of a bottom panel of the mattress pad and an inner layer of the bottom panel of the mattress pad.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, “a” is not intended as limiting of the number of items. Also the use of relational terms, such as but not limited to, “top,” “bottom,” “left,” “right,” “upper,” “lower,” “down,” “up,” “side,” are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
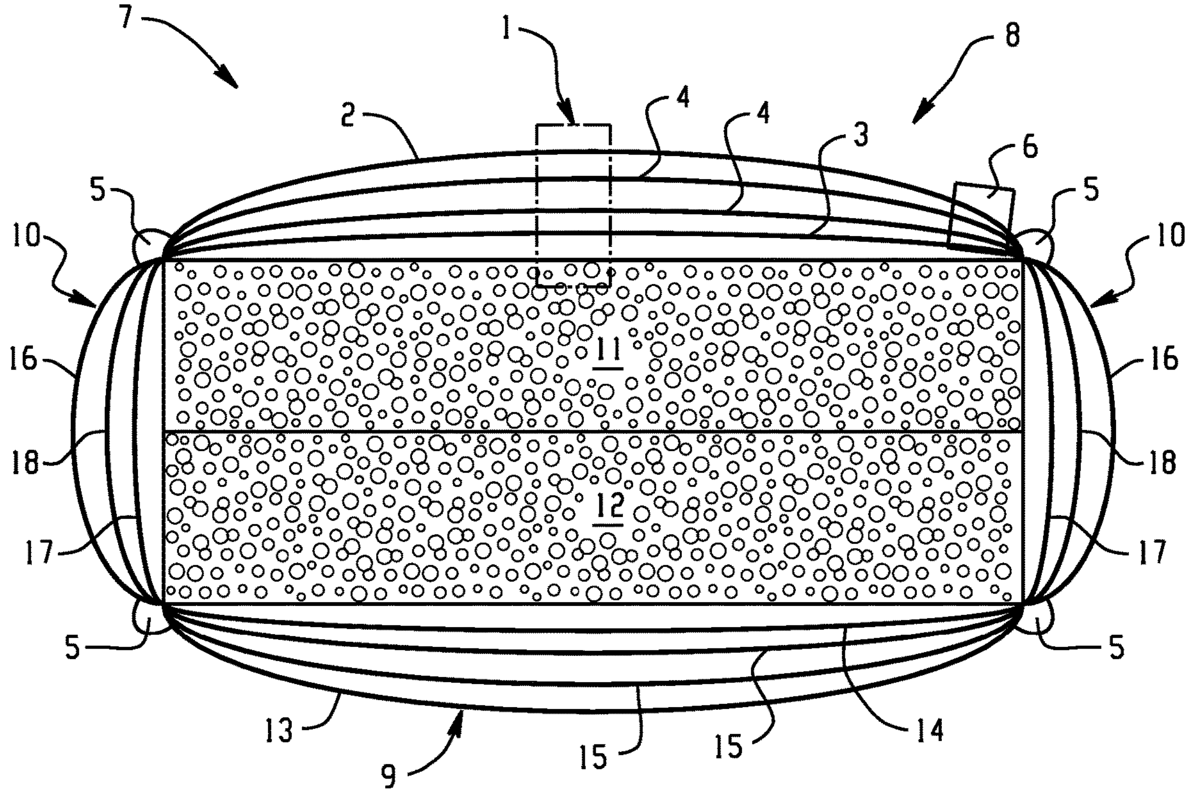
FIG. 1 is a schematic cross-sectional view showing layers of an example grounded mattress and mattress pad, in accordance with some embodiments.

FIG. 1 is a schematic cross-sectional view showing layers of an example grounded mattress 7. The grounded mattress 7 shown in FIG. 1 includes a mattress pad 1 that includes a top panel 8. The grounded mattress 7 may further include a mattress encasement that includes the top panel 8, a bottom panel 9, four side panels 10 (only two side panels are shown), and conductive edge ribbons 5. In addition to the mattress encasement, the grounded mattress 7 may include two inner foam layers 11, 12. In other embodiments, the grounded mattress 7 may include a single inner layer that may be foam or may be a different material. The top, bottom, and side panels 8, 9, 10 may also be referred to as top, bottom, and side portions.

The top panel 8 of the grounded mattress 7 includes a conductive outer layer 2, a conductive inner layer 3, one or more interior layers 4, and one or more conductive edge ribbons 5, and may have the same composition as the mattress pad 1 described below with reference to FIG. 2. The bottom panel 9 of the grounded mattress 7 includes a conductive outer layer 13, a conductive inner layer 14, one or more interior layers 15, and one or more conductive edge ribbons 5. The side panels 10 include a conductive outer layer 16, a conductive inner layer 17, one or more interior layers 18, and one or more conductive edge ribbons 5. In embodiments, each of the top 8, bottom 9, and side 10 panels may have its own conductive edge ribbons 5 that connect the respective conductive inner and outer layers. In such embodiments, where each panel 8, 9, 10 has its own conductive edge ribbon 5, the side panels 10 may, for example, be connected to the top 8 and bottom 9 panels with mechanical fasteners 19 (such as zippers), which may electrically connect the conductive panels of adjacent panels (e.g., via the respective conductive edge ribbons 5). In other embodiments, conductive edge ribbons 5 are used to mechanically and electrically connect the side panels 10 to the top 8 and bottom 9 panels. These may be the same conductive edge ribbons used to connect the inner and outer layers of each panel, or they may be different conductive edge ribbons.

The mattress 7 may be electrically grounded with a grounding terminal 6 that is attached to the mattress 7 and electrically coupled to the conductive outer and inner layers of each of the mattress panels 8, 9, 10. For example, the grounding terminal 6 may be an electrical connector button that is attached and electrically connected to the conductive outer layer 2 of the top panel 8 and thus also electrically coupled to the conductive inner and outer layers of each panel 8, 9, 10 via the conductive edge ribbons 5. In the example embodiments shown in FIGS. 1 and 2, the grounding terminal 6 is represented by a box showing the region where it may be located. The mattress 7 may be supplied with at least one electrical grounding cable (not shown) that attaches to the grounding terminal 6 for electrically coupling the grounding terminal to ground. For example, in embodiments a grounding cable has a clip terminal at one end that can be connected to (e.g., snapped onto) the grounding terminal 6, and a grounding terminal at the other end that can be connected to electrical ground. The grounding terminal may, for example, be an adapter plug with a prong that can be plugged into a ground terminal of a wall socket. In other embodiments, the ground terminal may include an alligator clip to be connected to any grounding source, such as a water pipe or metal rod embedded in the earth. The electrical grounding cable, when connected to the grounding terminal 6, grounds the mattress pad 1 and the person lying on the mattress 7. The grounding device may provide a way to directly connect a user's body to the earth and enable electrical discharge off the human body. This is accomplished by connecting conductive items (in this case a conductive mattress) to the body while connecting the mattress to a grounding source, such as a ground plug in an electrical outlet. A grounding mattress then grounds the human body, which helps the body get closer to a natural electrical potential. Using a grounded mattress allows the user to have a natural electrical potential all night long as they sleep, which is helpful in reducing static electricity, static shocks and potentially enhancing quality sleep as well. The mattress will also improve shielding from electromagnetic fields (EMFs), as understood by one of ordinary skill in the art.

In embodiments, the conductive outer layers 2, 13, 16 of the mattress 7 each include a fabric or fabric blend woven with conductive material such as silver or carbon fibers (e.g., threads). For example, in one embodiment, the conductive outer layers 2, 13, 16 may be a hypoallergenic silver fabric woven with silver threads (300 gr/$m^2$) that includes a knitted fabric temistocle [3% Viscose, 96% Polyester, 1% Silver]. In other embodiments, other fabric or fabric blends woven with conductive material may be used. In embodiments, the conductive outer layers 2, 13, 16 includes conductive (e.g., silver or carbon) fibers that are woven into the fabric of the conductive outer layer in a longitudinal or diagonal direction. In embodiments, the materials used for the conductive outer layers 2, 13, 16 are selected to prevent the formation of bacteria, support airflow and temperature release, and provide conductivity for grounding.

In embodiments, the conductive inner layers 3, 14, 17 of the mattress 7 also includes a fabric or fabric blend interwoven with conductive material, such as silver or carbon fibers (e.g., threads). For example, in one embodiment, the conductive inner layers 3, 14, 17 are an electromagnetic Silver Shield Layer™ (200 gr/$m^2$) that includes a knitted fabric BBCC Silver Shield [99% Polyester, 1% Silver]. In other embodiments, the conductive inner layers 3, 14, 17 of the mattress include other fabric or fabric blends interwoven with conductive material. In embodiments, the conductive inner layers 3, 14, 17 include a fabric that is interwoven with conductive (e.g., silver or carbon) fibers that are woven into the fabric of the conductive inner layer in longitudinal and diagonal directions with multiple crossing (i.e., interconnecting) fibers. In other embodiments, the conductive fibers are woven into the fabric of the inner layer at angles such that conductive fibers are perpendicular to one another and intersect other fibers at 90° angles.

In embodiments, the interior layers 4 of the top panel 8 of the mattress 7 include a fire-retardant layer, a memory foam layer, and a second foam layer. The fire-retardant layer may, for example, be a durable fire-retardant material (220 gr/$m^2$) that includes a White California Layer [80% Viscose, 20% Polyester]. The memory foam layer may, for example, be a silver Thermofresh Memory Foam embedded with silver ions (900 gr/$m^2$) that includes Mind d.45 Climafresh (Viscoelastic) Polyurethane (PU) Foam (density 45 kg/$m^3$). The materials for a memory foam layer may, for example, be selected to reduce pressure points, provide a bacteria free environment, and provide an integrated thermos capsules to help maintain body temperature. The second foam layer may, for example, be Polyurethane foam 25XS (500 gr/$m^2$). The materials for the second foam layer can be selected to provide a soft feeling and adjustment to body shape. In embodiments, the interior layers 15, 18 of the bottom 9 and side 10 panels of the mattress 7 include a fire-retardant layer and a polyester layer. The fire-retardant layer may, for example, be a durable fire-retardant material (220 gr/$m^2$) that includes a White California Layer [80% Viscose, 20% Polyester]. The polyester layer may, for example, be Polyester E/F (180 gr/$m^2$) with 100% Polyester. In other embodiments, materials different from those described above are used in the interior layers 4 of the top, bottom, or side panels of the grounded mattress 7.

In embodiments, the inner foam layers 11, 12 of the mattress 7 include two thick layers 11 and 12 with different density of Elio-cell foam. For example, in one embodiment, the top foam layer 11 is Polyurethane (PU) Foam T30 orange color (30 kg/$m^3$), and the bottom foam layer 12 is PU Foam T28 azure blue color (28 kg/$m^3$). The color of the top and bottom foam layers 11, 12 may be different to assist users and manufacturers in distinguishing the top foam layer 11 from the bottom foam layer 12. As discussed above, in other embodiments the grounded mattress 7 includes a single inner layer that may be foam or may be a different material.

In embodiments, the conductive edge ribbon 5 includes a fabric or fabric blend interwoven with metallic threads such as silver or carbon fibers. In embodiments, the conductive edge ribbon 5 includes a polyester material or blend that is woven with conductive (e.g., silver or carbon) fibers in multiple directions with multiple crossing (i.e., interconnecting) fibers. For example, in one embodiment, the conductive edge ribbon 5 has a fabric composition of 94% Polyester, 5%

Carbon, and 1% conductive fibers. In other embodiments, the conductive edge ribbon 5 includes other fabric or fabric blends and/or is interwoven with other conductive material. As detailed above, the conductive edge ribbon 5 electrically connects the conductive outer and inner layers, which together form a conductive netting which, in embodiments provides conductivity in all directions and at approximately every inch of the fabric such that a person lying on the mattress 7 is always grounded regardless of whether the person is turning its body or bending.

Figure 2:
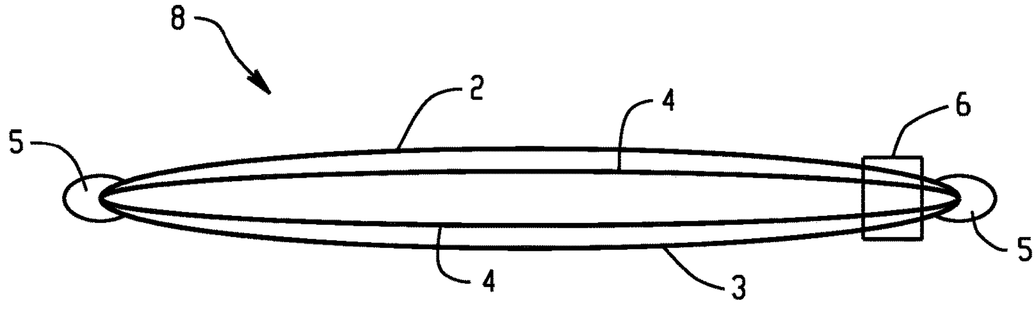
FIG. 2 is a schematic cross-sectional view showing layers of an example grounded mattress pad, in accordance with some embodiments.

FIG. 2 is a schematic cross-sectional view showing layers of an example grounded mattress pad 1. In the embodiment shown in FIG. 2, the grounded mattress pad 1 includes a conductive outer layer 2, a conductive inner layer 3, one or more interior layers 4, and one or more conductive edge ribbons 5. It should be understood that although two interior layers 4 are illustrated in FIG. 2, other embodiments of the grounded mattress pad 1 include fewer or more than two interior layers.

The conductive outer layer 2 and the conductive inner layer 3 of the mattress pad 1 are electrically conductive, and are connected (e.g., sewn) together by the one or more conductive edge ribbons 5, such that the conductive outer layer 2 is electrically coupled to the conductive inner layer 3. As discussed above, this can allow electrical discharge off the human body when a person is lying on the mattress and a grounding cable is utilized to ground the mattress. This can help the body get closer to a natural electrical potential. Using a grounded mattress allows the user to have a natural electrical potential all night long as they sleep, which is helpful in reducing static electricity, static shocks and potentially enhancing quality sleep as well. The mattress will also improve shielding from electromagnetic fields (EMFs), as understood by one of ordinary skill in the art. The one or more interior layers 4 of the mattress pad 1 may be made of non-conductive material.

The mattress pad 1 is also electrically grounded with a grounding terminal 6 that is attached to the mattress pad 1 and electrically coupled to the conductive outer 2 and inner layers 3. For example, the grounding terminal 6 may be an electrical connector button that is attached and electrically connected to the conductive outer layer 2 and thus also electrically coupled to the conductive inner layer 3 via the conductive edge ribbons 5. The mattress pad 1 is supplied with at least one electrical grounding cable (not shown) that attaches to the grounding terminal 6 for electrically coupling the grounding terminal to ground. For example, in embodiments a grounding cable has a clip terminal at one end that can be connected to (e.g., snapped onto) the grounding terminal 6, and a second grounding terminal at the other end that can be connected to an electrical ground. The second grounding terminal may, for example, be an adapter plug with a prong that can be plugged into a ground terminal of a wall socket. In other embodiments, the second ground terminal may include an alligator clip to be connected to any grounding source, such as a water pipe or metal rod embedded in the earth. The electrical grounding cable, when connected to the grounding terminal 6, grounds the mattress pad 1 and the person lying on the mattress pad 1. The grounding device may provide a way to directly connect a user's body to the earth and enable electrical discharge off the human body. This is accomplished by connecting conductive items (in this case a conductive mattress) to the body while connecting the mattress to a grounding source, such as a ground plug in an electrical outlet. A grounding mattress then grounds the human body, which helps the body get closer to a natural electrical potential. Using a grounded mattress allows the user to have a natural electrical potential all night long as they sleep, which is helpful in reducing static electricity, static shocks and potentially enhancing quality sleep as well. The mattress will also improve shielding from electromagnetic fields (EMFs), as understood by one of ordinary skill in the art.

In embodiments, the conductive outer layer 2 of the mattress pad 1 includes a fabric or fabric blend woven with silver or carbon fibers (e.g., threads). Conductive fibers other than silver or carbon fibers may also be woven into the fabric or fabric blend in addition to, or in place of, silver or carbon fibers. In one embodiment, the conductive outer layer 2 is a hypoallergenic silver fabric woven with silver threads (300 gr/$m^2$) that includes a knitted fabric temistocle [3% Viscose, 96% Polyester, 1% Silver]. In other embodiments, the conductive outer layer is another fabric or fabric blend interwoven with conductive fibers. In embodiments, the conductive outer layer 2 includes conductive (e.g., silver or carbon) fibers that are woven into the fabric of the conductive outer layer 2 in a longitudinal or diagonal direction. In embodiments, the materials used for the conductive outer layer 2 are selected to prevent the formation of bacteria, support air flow and temperature release, and provide conductivity for grounding.

In embodiments, the conductive inner layer 3 of the mattress pad 1 includes a fabric or fabric blend interwoven with silver or carbon fibers (e.g., threads). For example, in one embodiment, the conductive inner layer 3 is an electromagnetic Silver Shield Layer™ (200 gr/m2) that includes a knitted fabric BBCC Silver Shield [99% Polyester, 1% Silver]. As discussed above, the conductive inner layer 3 may include other materials in alternate embodiments. In embodiments, the conductive inner layer 3 includes a fabric that is interwoven with conductive (e.g., silver or carbon) fibers, for example, that are woven into the fabric of the conductive inner layer 3 in longitudinal and diagonal directions with multiple crossing (i.e., interconnecting) fibers.

In embodiments, the interior layers 4 of the mattress pad 1 include a fire-retardant layer, a memory foam layer, and a second foam layer. A fire-retardant layer may, for example, be a durable fire-retardant material (220 gr/$m^2$) that includes a White California Layer [80% Viscose, 20% Polyester]. A memory foam layer may, for example, be a silver Thermofresh Memory Foam embedded with silver ions (900 gr/$m^2$) that includes Mind d.45 Climafresh (Viscoelastic) Polyurethane (PU) Foam of density 45 kg/$m^3$. The materials for a memory foam layer may, for example, be selected to reduce pressure points, provide a bacteria free environment, and provide an integrated thermos capsules to help maintain body temperature. A second foam layer may, for example, be Polyurethane foam 25XS (500 gr/$m^2$). The materials for the second foam layer may be selected to provide a soft feeling and adjustment to body shape. In other embodiments, the interior layers 4 of the mattress pad 1 include materials other than the specific examples mentioned herein.

Figure 3B:
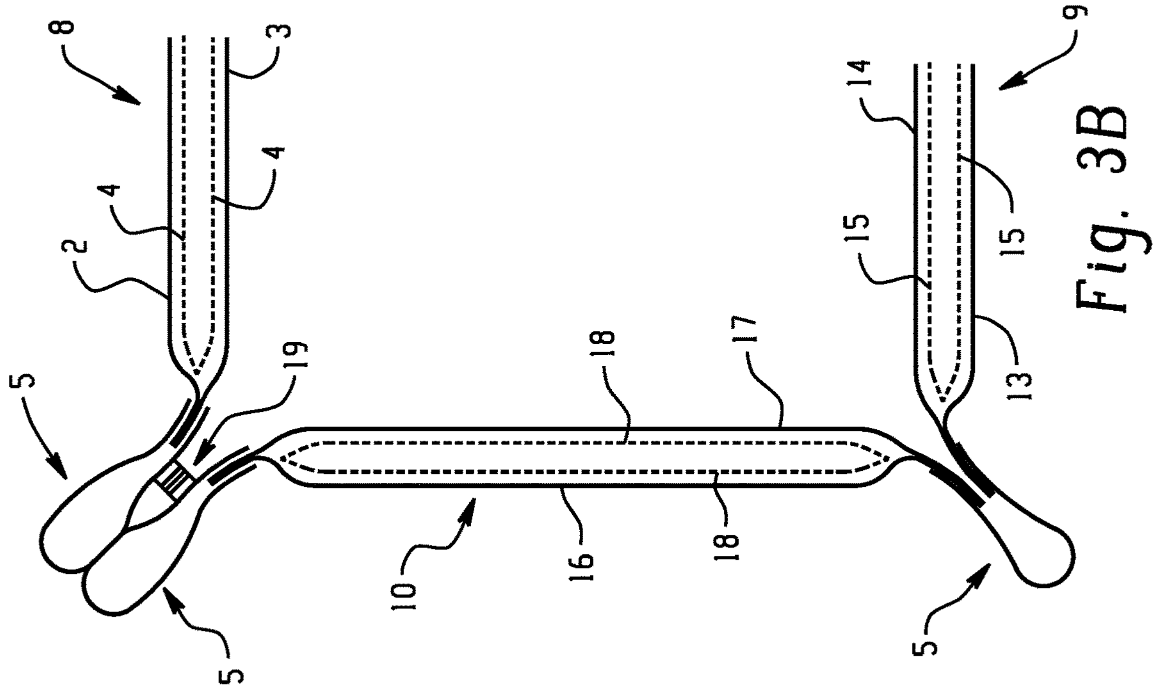
FIG. 3B is a diagram showing an example connection between a top panel and a side panel and an example connection between the side panel and a bottom panel of an example grounded mattress, with connected mechanical fasteners, in accordance with some embodiments.
Figure 3A:
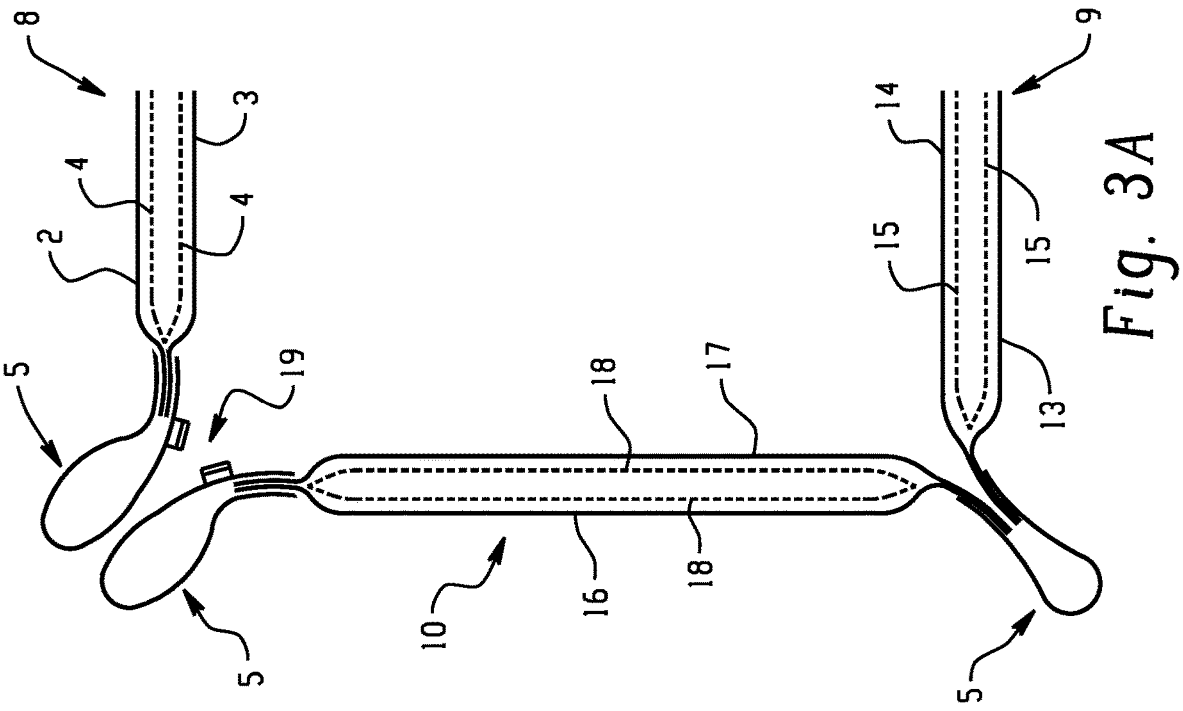
FIG. 3A is a diagram showing an example connection between a top panel and a side panel and an example connection between the side panel and a bottom panel of an example grounded mattress, in accordance with some embodiments.

FIG. 3A is a diagram showing an example connection between a top panel 8 and a side panel 10 and an example connection between the side panel 10 and a bottom panel 9 of an example grounded mattress 7, in accordance with some embodiments. As detailed above with reference to FIGS. 1 and 2, the conductive outer layer 2 of the top panel 8 may, for example, be comprised of a fabric or fabric blend that is woven with conductive (e.g., silver and/or carbon) fabric in one (e.g., longitude or diagonal) direction or in two differing and intersecting directions. The conductive inner layer 3 may, for example, be comprised of a fabric or fabric blend that is woven with conductive (e.g., silver and/or or carbon)

fibers in two (e.g., longitude and diagonal) directions with connections between intersecting fibers. In the example of FIG. 3A, the outer 2 and inner 3 layers of the top panel 8 are connected by a conductive edge ribbon 5. Furthermore, in the example embodiment of FIG. 3A, the outer 16 and inner 17 layers of the side panel 10 are connected at a top region of the side panel 10 by a separate conductive edge ribbon 5.

A mechanical fastener 19 may be used to connect the top panel 8 to the side panel 10. This mechanical fastener 19 may, for example, be a zipper. In some embodiments, the mechanical fastener 19 has a first portion attached to the conductive edge ribbon 5 of the top panel 8 and a second portion attached to the conductive edge ribbon 5 of the side panel 10. In other embodiments, the first and second portions of the mechanical fastener 19 may be attached to the top 8 or side 10 panels at a place other than the conductive edge ribbon 5. The mechanical fastener 19 may allow the conductive edge ribbons 5 of the top panel 8 and side panel 10 to come into contact with one another and thus be electrically coupled, as shown in the example of FIG. 3B. In other embodiments, the mechanical fastener 19 may be made of conductive material and may provide the electrical coupling between the top 8 and side 10 panels. In still other embodiments, a single conductive edge ribbon 5 may be used to provide the connection between the outer and inner layers of the top 8 and side 10 panels. This connection may be similar to the example connection between the side 10 and bottom 9 panels, as described below.

FIGS. 3A and 3B also illustrate an example connection between the inner 17 and outer 16 layers of the side panel 10 and the inner 14 and outer 13 layers of the bottom panel 9. As shown in FIGS. 3A and 3B, a single conductive edge ribbon 5 can be used to provide this connection between the inner and outer conductive layers of both the side 10 and bottom 9 panel. For example, the conductive edge ribbon 5 can be attached by a sewn connection through each end of the conductive edge ribbon 5, as well as the inner and outer layers of the side 10 and bottom 9 panel. In other embodiments, a second mechanical fastener (not shown) can be used to connect the inner and outer layers of the side panel 10 and the bottom panel 9. This second mechanical fastener can be of the same or a similar design as mechanical fastener 19, or it may be a different mechanical fastener.

Figure 4A:
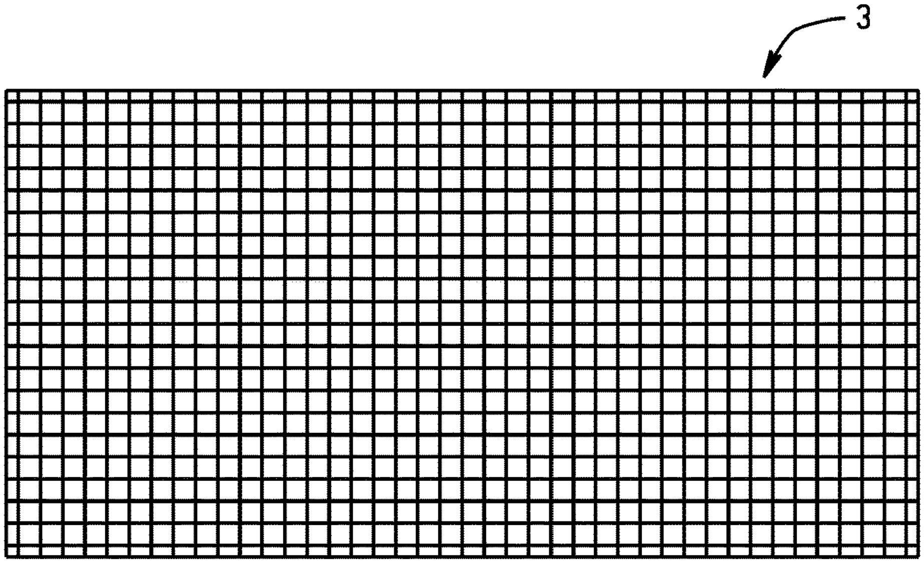
FIG. 4A is a schematic of an example pattern of threading for conductors within an inner layer of a mattress pad, in accordance with some embodiments.
Figure 4B:
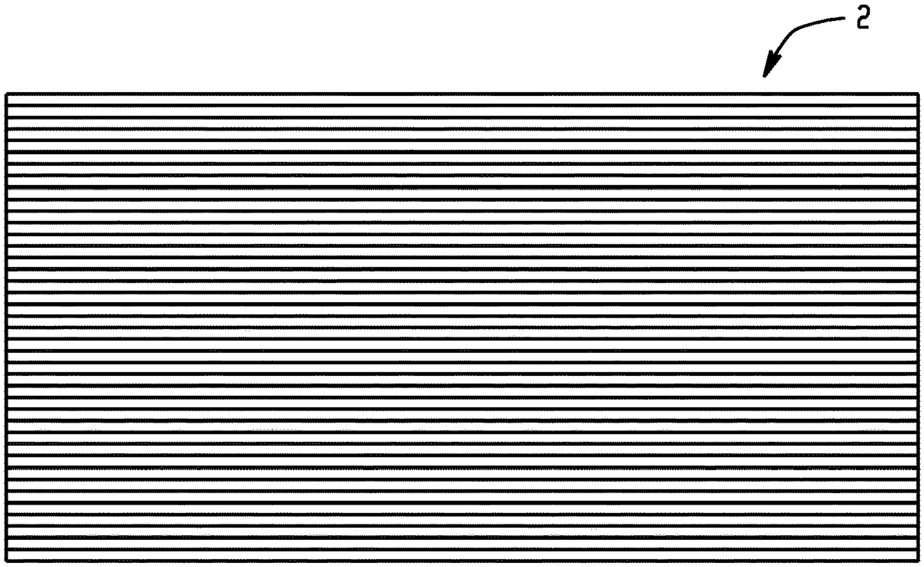
FIG. 4B is a schematic of an example pattern of threading for conductors within an outer layer of a mattress pad, in accordance with some embodiments.
Figure 4C:
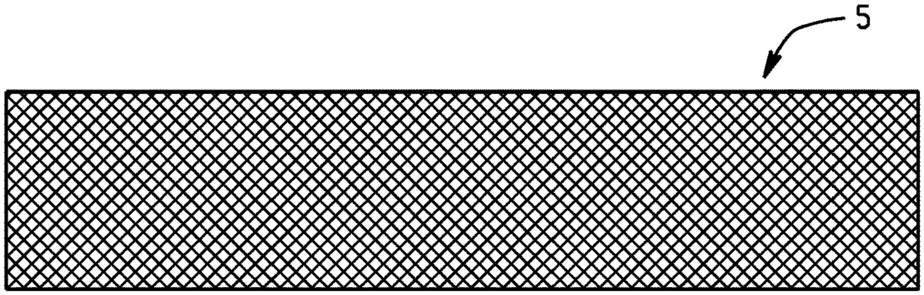
FIG. 4C is a schematic of an example pattern of threading for conductors within a conductive edge ribbon, in accordance with some embodiments.

FIGS. 4A, 4B, and 4C are schematics of isolated views of the conductive inner layer 3, the conducive outer layer 2, and the conductive edge ribbon 5, respectively. As demonstrated in FIG. 4A, the conductive inner layer may include conductive (e.g., silver and/or carbon) fibers that are woven in two differing directions such that the fibers intersect one another at multiple points. In the example shown in FIG. 4A, the fibers are woven perpendicularly to one another. In another embodiment, the conductive fibers are woven at an angle to one another that differs from 90°. FIG. 4B shows an isolated view of a conductive outer layer 2 of a grounded mattress 7. As depicted in FIG. 4B, the conductive outer layer 2 may include conductive fibers that are woven substantially parallel to one another. In the present disclosure, substantially parallel is defined as an arrangement in which the fibers are aligned adjacent to one another and in a direction such that the adjacent fibers do not intersect one another. In some embodiments, the conductive fibers are woven substantially parallel to one another in a lateral direction relative to the grounded mattress 7. In other embodiments, the conductive fibers are woven in a longitudinal or diagonal direction. FIG. 4C depicts a conductive edge ribbon 5, in accordance with embodiments. As shown in FIG. 4C, conductive fibers of the conductive edge ribbon 5 may be woven in a crisscross pattern. In other embodiments of the present disclosure, conductive fibers of the conductive edge ribbon 5 are woven in a different pattern while still allowing the conductive fibers to intersect at multiple points.

Figure 5:
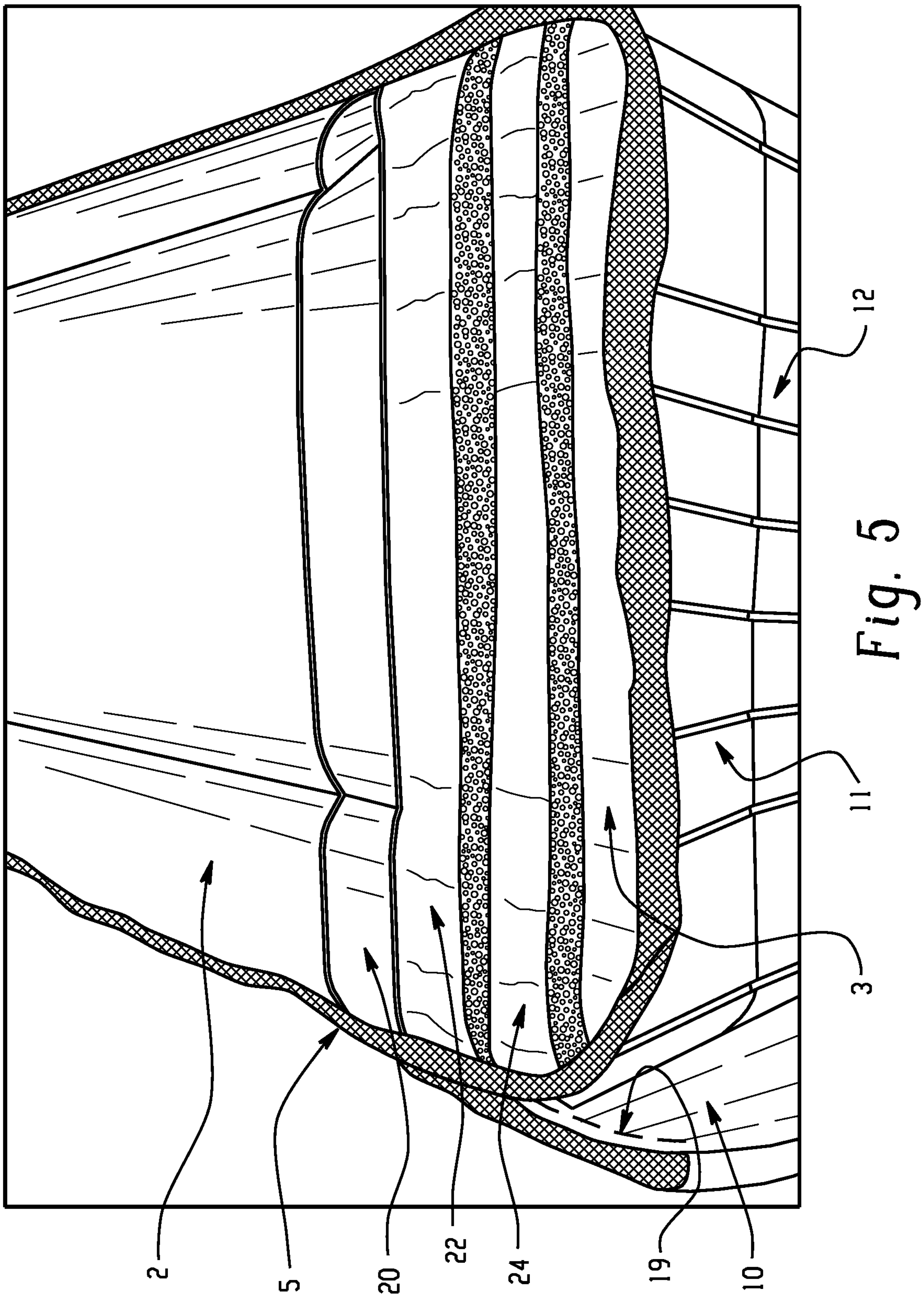
FIG. 5 depicts a cut-away view of a top panel of an example grounded mattress, in accordance with some embodiments.

FIG. 5 depicts a cut-away view of a top panel of an example grounded mattress 7. Shown in FIG. 5 are examples of a conductive outer layer 2, a conductive inner layer 3, interior layers 20, 22, 24, and conductive edge ribbons 5. The conductive outer layer 2 in the illustrated embodiment includes a fabric blend woven with silver or carbon fibers (e.g., threads), such as a hypoallergenic silver fabric woven with silver threads (300 gr/$m^2$) that includes a knitted fabric temistocle [3% Viscose, 96% Polyester, 1% Silver]. The conductive inner layer 3 in the illustrated embodiment includes a fabric blend interwoven with silver or carbon fibers (e.g., threads), such as an electromagnetic Silver Shield Layer™ (200 gr/m2) that includes a knitted fabric BBCC Silver Shield [99% Polyester, 1% Silver]. The interior layers in the illustrated embodiment include a fire-retardant layer 20, a memory foam layer 22, and a second foam layer 24. The fire-retardant layer 20 may, for example, be a durable fire-retardant material (220 gr/$m^2$) that includes a White California Layer [80% Viscose, 20% Polyester]. The memory foam layer 22 may, for example, be a silver Thermofresh Memory Foam embedded with silver ions (900 gr/$m^2$) that includes Mind d.45 Climafresh (Viscoelastic) Polyurethane (PU) Foam of density 45 kg/$m^3$. The materials for a memory foam layer 22 may, for example, be selected to reduce pressure points, provide a bacteria free environment, and provide an integrated thermos capsules to help maintain body temperature. The second memory foam layer 24 may, for example, be Polyurethane foam 25XS (500 gr/$m^2$). The materials for the second foam layer 24 may be selected to provide a soft feeling and adjustment to body shape. Also shown in 5 is the conductive edge ribbon 5 that electrically connects that conductive inner 3 and outer 2 layers, as described above with reference to FIGS. 1 and 2. In other embodiments, the layers and elements of the example grounded mattress 7 shown in FIG. 5 include materials different from the specific examples mentioned herein.

Figure 6:
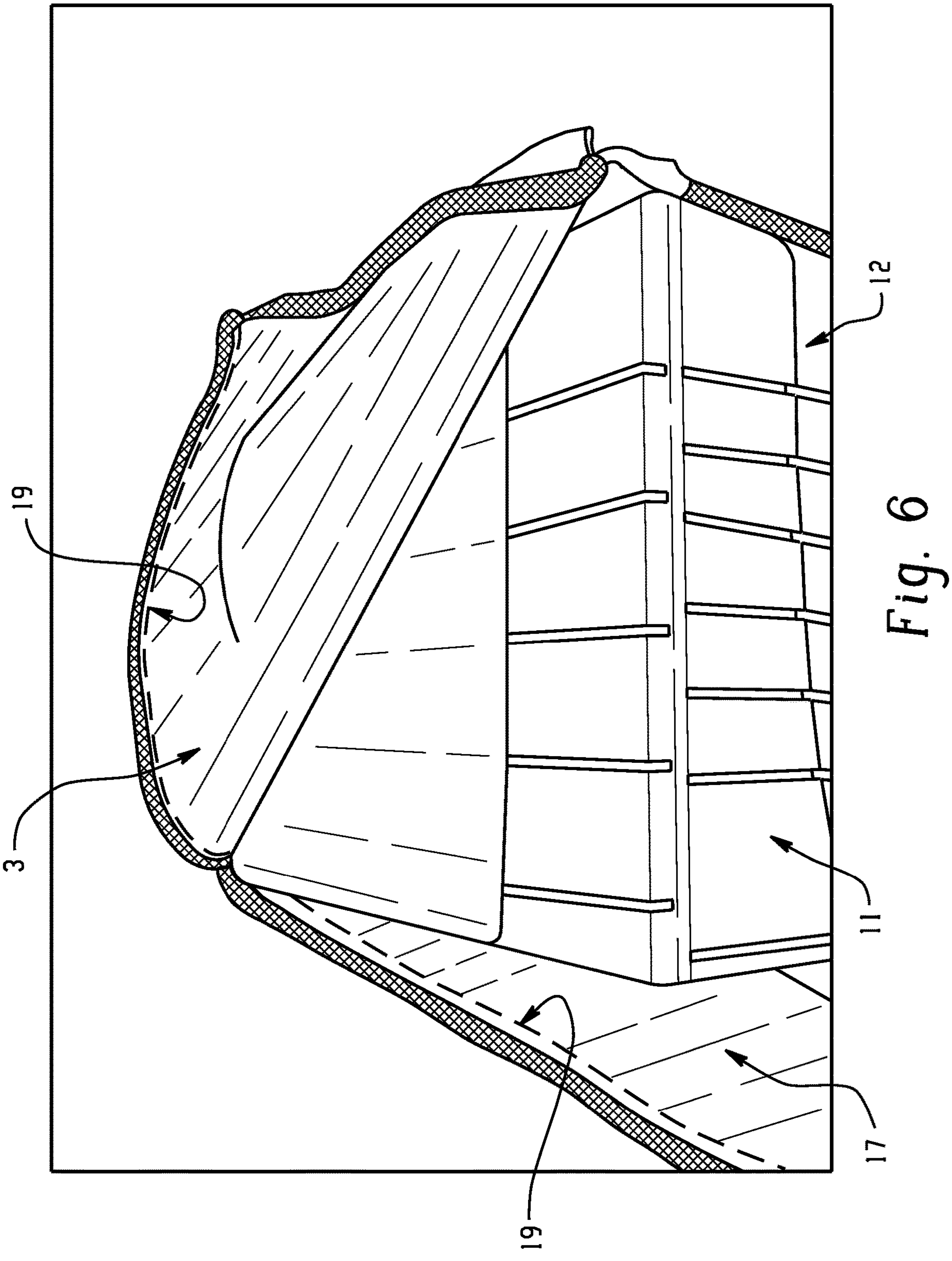
FIG. 6 shows the inner conductive layer of a top panel of an example grounded mattress, in accordance with some embodiments.

FIG. 6 shows the inner conductive layer 3 of a top panel 8 of an example grounded mattress 7. Also seen in FIG. 6 are examples of the inner conductive layer 17 of a side panel 10 and inner foam layers 11, 12 of the grounded mattress 7. As shown in FIG. 6, the inner conductive layer 3 of a top panel 8 and the inner conductive layer 17 of a side panel 10 may each include conductive fibers that are woven in differing directions such that the conductive fibers intersect one another at multiple points. The patterns in which the inner conductive layer 3 of a top panel 8 and the inner conductive layer 17 of a side panel 10 are woven may be the same or may differ from one another, in accordance with some embodiments.

Figure 7:
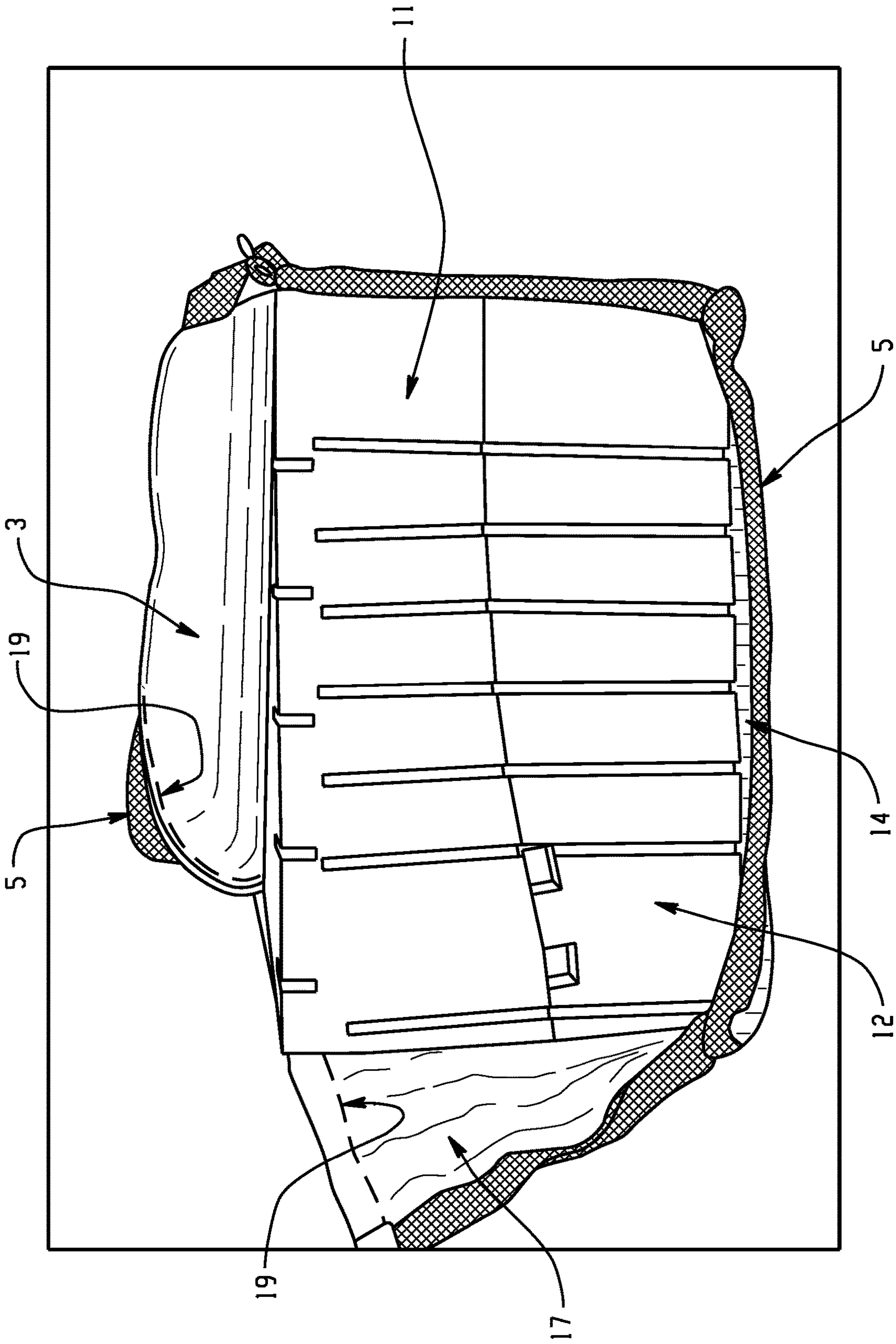
FIG. 7 is a schematic showing inner foam layers of an example grounded mattress, in accordance with some embodiments.

FIG. 7 is a schematic showing inner foam layers 11, 12 of an example grounded mattress 7. Also shown in FIG. 7 are the inner conductive layers 3, 14, 17 of the top, bottom, and side panels of the grounded mattress 7.

Figure 8:
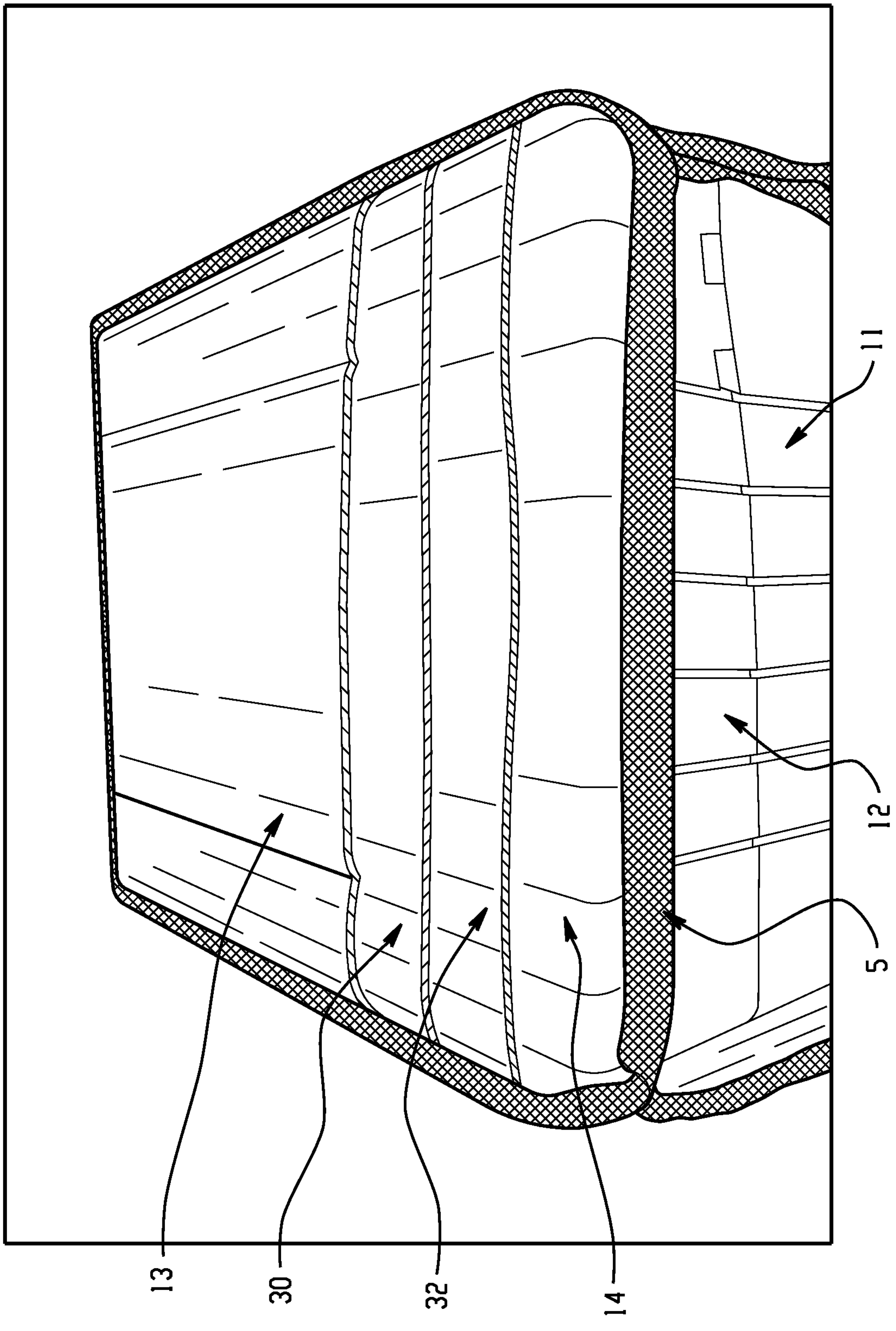
FIG. 8 shows a cut-away view of a bottom panel of an example grounded mattress, in accordance with some embodiments.

FIG. 8 shows a cut-away view of a bottom panel of an example grounded mattress 7. Shown in FIG. 8 are examples of a conductive outer layer 13, a conductive inner layer 14, interior layers 30, 32, and conductive edge ribbons 5. The conductive outer layer 13 in the illustrated embodiment includes a fabric blend woven with silver or carbon fibers (e.g., threads), such as a hypoallergenic silver fabric woven with silver threads (300 gr/$m^2$) that includes a knitted fabric temistocle [3% Viscose, 96% Polyester, 1% Silver]. As discussed above, the conductive outer layer 13 may include other materials.

The conductive inner layer 14 in the illustrated embodiment includes a fabric blend interwoven with silver or carbon fibers (e.g., threads), such as an electromagnetic Silver Shield Layer™ (200 gr/$m^2$) that includes a knitted fabric BBCC Silver Shield [99% Polyester, 1% Silver]. The interior layers in the illustrated embodiment include a fire-retardant layer 30 and a polyester layer 32. The fire-retardant layer 30 may, for example, be a durable fire-retardant material (220 gr/$m^2$) that includes a White California Layer [80% Viscose, 20% Polyester]. The polyester layer 32 may, for example, be Polyester E/F (180 gr/$m^2$) with 100% Polyester. Also shown in FIG. 8 is the conductive edge ribbon 5 that electrically connects that conductive inner 14 and outer 13 layers, as described above with reference to FIGS. 1 and 2. The materials used in the conductive inner layer 14 and the interior layers may include materials other than those specifically mentioned above.

Figure 9:
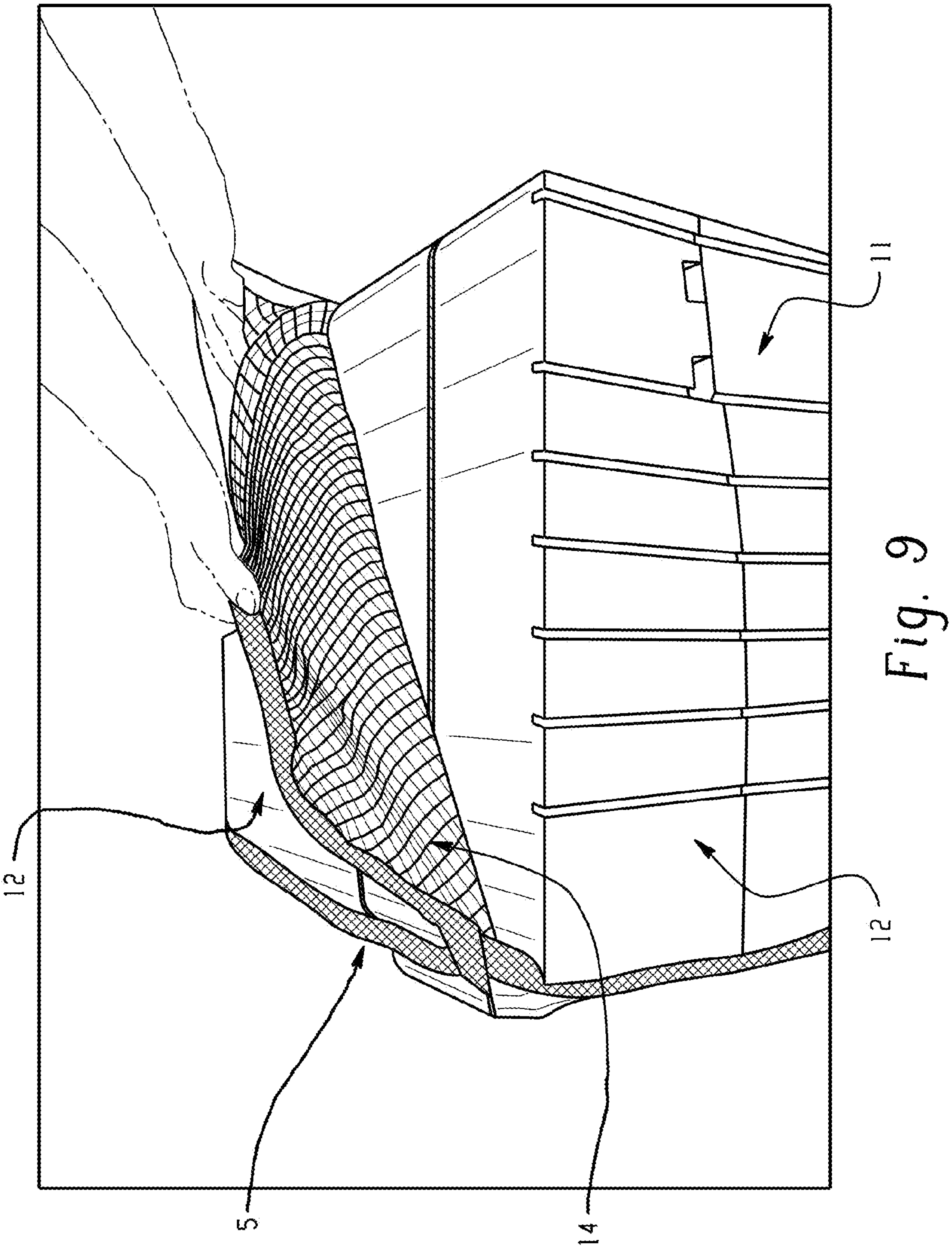
FIG. 9 shows an inner conductive layer of a bottom panel of an example grounded mattress, in accordance with some embodiments.

FIG. 9 shows an inner conductive layer 14 of a bottom panel 9 of an example grounded mattress 7. As shown in FIG. 9 and as discussed above, the inner layer 14 may include conductive fibers that are woven into the fabric of the conductive inner layer in longitudinal and diagonal directions with multiple crossing (i.e., interconnecting) fibers. In other embodiments of the present disclosure, the inner layer 14 may include conductive fibers that are woven into the fabric in a crisscross pattern, that are woven with a 45° angle to one another, with a 90° angle to one another, or with a different angle to one another.

Figure 10:
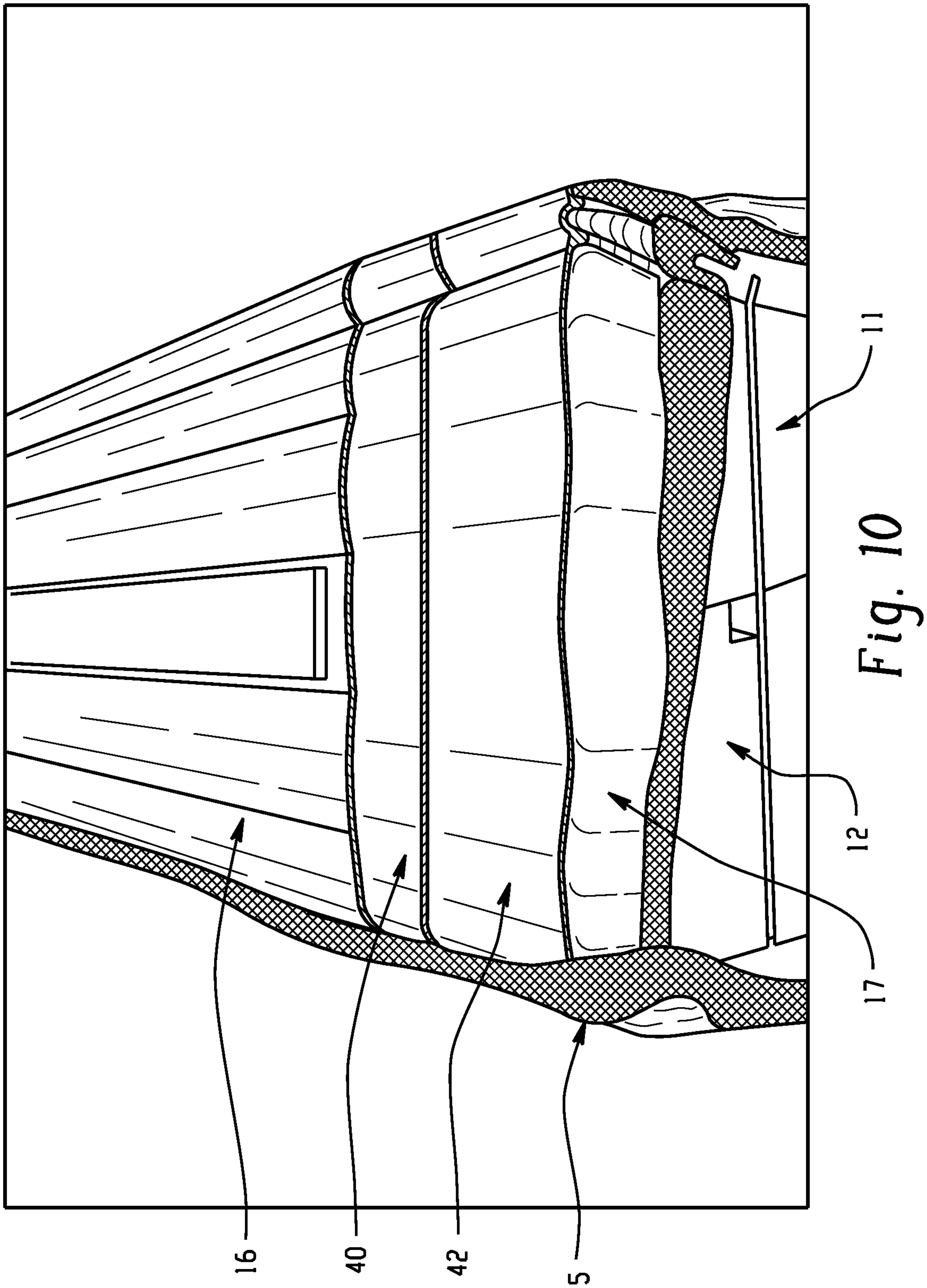
FIG. 10 is a schematic showing a cut-away view of a side panel of an example grounded mattress, in accordance with some embodiments.

FIG. 10 is a schematic showing a cut-away view of a side panel 10 of an example grounded mattress 7. Shown in FIG. 10 are examples of a conductive outer layer 16, a conductive inner layer 17, interior layers 40, 42, and a conductive edge ribbons 5. The conductive outer layer 16 in the illustrated embodiment includes a fabric blend woven with silver or carbon fibers (e.g., threads), such as a hypoallergenic silver fabric woven with silver threads (300 gr/$m^2$) that includes a knitted fabric temistocle [3% Viscose, 96% Polyester, 1% Silver]. The conductive inner layer 17 in the illustrated embodiment includes a fabric blend interwoven with silver or carbon fibers (e.g., threads), such as an electromagnetic Silver Shield Layer™ (200 gr/$m^2$) that includes a knitted fabric BBCC Silver Shield [99% Polyester, 1% Silver]. The interior layers in the illustrated embodiment include a fire-retardant layer 40 and a polyester layer 42. The fire-retardant layer 40 may, for example, be a durable fire-retardant material (220 gr/$m^2$) that includes a White California Layer [80% Viscose, 20% Polyester]. The polyester layer 42 may, for example, be Polyester E/F (180 gr/$m^2$) with 100% Polyester. Also shown in FIG. 10 is the conductive edge ribbon 5 that electrically connects that conductive inner 17 and outer 16 layers, as described above with reference to FIGS. 1 and 2. As mentioned above, the conductive outer layer 16, the conductive inner layer 17, the interior layers, and/or the conductive edge ribbon 5 may include materials other than the specific examples mentioned herein, in other embodiments of the present disclosure.

Figure 11:
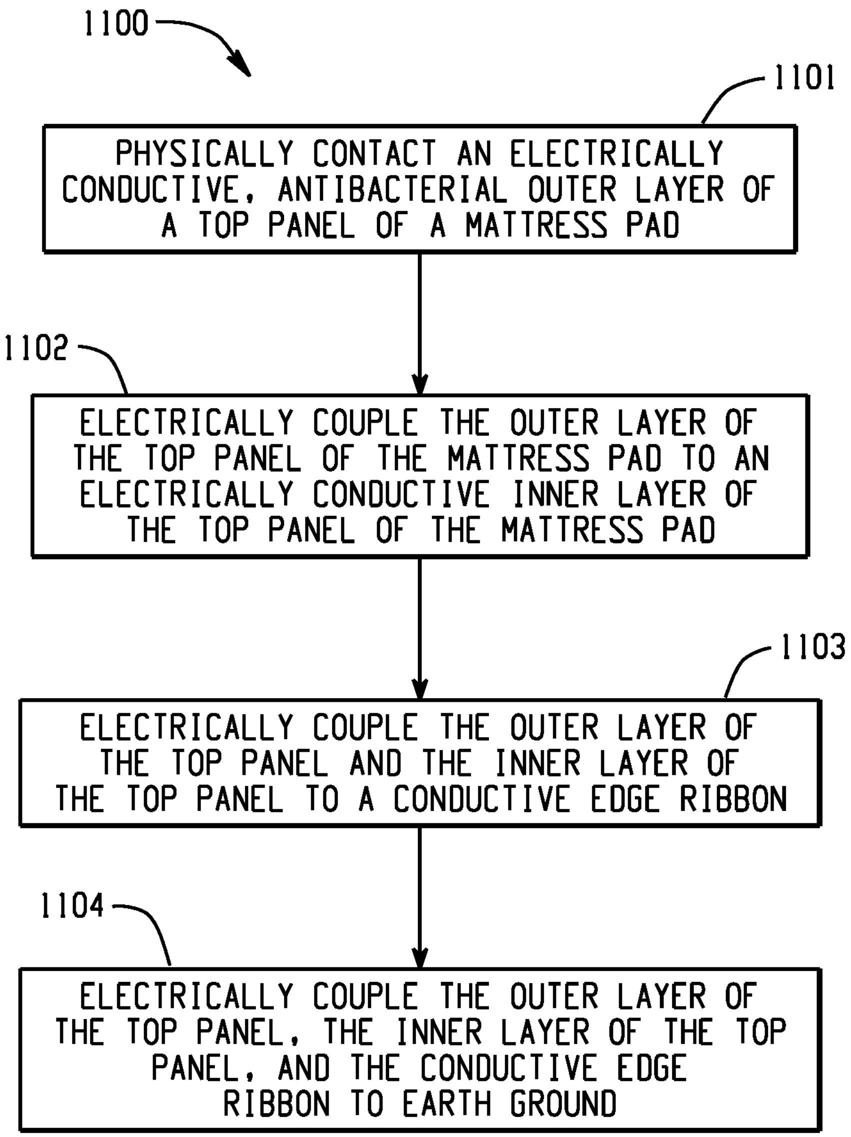
FIG. 11 is a flow diagram showing a method of electrical grounding, in accordance with some embodiments.

FIG. 11 is a flow diagram 1100 depicting a method of electrical grounding. In the example illustrated in FIG. 11, the first step 1101 is to physically contact an electrically conductive, antibacterial outer layer of a top panel of a mattress pad. The second step 1102 is to electrically couple the outer layer of the top panel of the mattress pad to an electrically conductive inner layer of the top panel of the mattress pad. The third step 1103 in the example shown in FIG. 11 is to electrically couple the outer layer of the top panel and the inner layer of the top panel to a conductive edge ribbon. The final step of the method depicted in FIG. 11 is to electrically couple the outer layer of the top panel, the inner layer of the top panel, and the conductive edge ribbon to earth ground.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A mattress pad comprising:

a top panel including:

an electrically conductive inner layer comprising a plurality of first conductive threads, the first conductive threads being woven in two differing and intersecting directions;

at least one insulating interior layer disposed on the conductive inner layer;

an electrically conductive outer layer disposed on the at least one insulating interior layer, the conductive outer layer:

not being in direct physical contact with the conductive inner layer; and comprising a plurality of second conductive threads, the second conductive threads being aligned substantially parallel to one another; and a conductive edge ribbon configured to electrically couple the conductive inner layer with the conductive outer layer, the conductive edge ribbon having a plurality of third conductive threads;

a side panel disposed proximate the top panel;

a grounding terminal attached to the outer conductive layer;

a grounding cable that is electrically coupled with the grounding terminal, the grounding cable being configured to electrically ground the inner conductive layer, the outer conductive layer, and the conductive edge ribbon; and a first mechanical fastener configured to releasably couple the top panel and the side panel, wherein when in a first configuration the first mechanical fastener electrically couples the top panel with the side panel and when in a second configuration the top panel and the side panel are not electrically coupled.

2. The mattress pad of claim 1, wherein the at least one insulating interior layer of the top panel includes a flame-retardant layer, a first foam layer, and a second foam layer.

3. The mattress pad of claim 2, wherein the grounding cable includes a first end that is connectable to and detachable from the grounding terminal and a second end that is configured to electrically couple the grounding terminal to earth ground.

4. The mattress pad of claim 3, wherein the plurality of third conductive threads in the conductive edge ribbon are interwoven in a pattern of intersecting and substantially straight lines.

5. The mattress pad of claim 4, wherein the plurality of third conductive threads comprise at least one of a silver thread and a carbon thread.

6. The mattress pad of claim 1, wherein the first mechanical fastener has a first portion directly attached to the conductive edge ribbon of the top panel and a second portion attached to a conductive edge ribbon of the side panel.

7. The mattress pad of claim 1, wherein the first mechanical fastener has a first portion attached to the top panel at a place other than the conductive ribbon and a second portion attached to the side panel at a place other than a conductive edge ribbon of the side panel.

8. A mattress comprising:
an inner foam layer having a first side and a second side, the first side being opposite the second side;
a top panel coupled to the first side of the inner foam layer, the top panel comprising:
an electrically conductive first inner layer comprising a plurality of first conductive threads woven in two differing and intersecting directions;
at least one insulating interior layer disposed on the electrically conductive first inner layer;
an electrically conductive first outer layer disposed on the at least one insulating interior layer, the electrically conductive first outer layer:
not being in direct physical contact with the conductive first inner layer; and
comprising a plurality of second conductive threads aligned substantially parallel to one another; and
a first conductive edge ribbon configured to electrically couple the conductive first inner layer with the conductive first outer layer, the first conductive edge ribbon having a plurality of third conductive threads;
a side panel disposed proximate the top panel;
a grounding terminal attached to the conductive first outer layer;
a grounding cable that is electrically coupled with the grounding terminal, the grounding cable being configured to electrically ground the conductive first inner layer, the conductive first outer layer, and the first conductive edge ribbon; and
a first mechanical fastener configured to releasably couple the top panel and the side panel, wherein when in a first configuration the first mechanical fastener electrically couples the top panel with the side panel and when in a second configuration the top panel and the side panel are not electrically coupled.

9. The mattress of claim 8, further comprising a mattress encasement configured to surround the inner foam layer, the mattress encasement comprising:
the top panel; and
the side panel coupled to a side area of the inner foam layer, the side panel including:
an electrically conductive second inner layer comprising a plurality of fourth conductive threads woven in two differing and intersecting directions;
an electrically conductive second outer layer comprising a plurality of fifth conductive threads aligned substantially parallel to one another, the conductive second inner layer being electrically coupled to the conductive second outer layer; and
a second conductive edge ribbon configured to electrically couple to the conductive second inner layer with the conductive second outer layer, the second conductive edge ribbon having a plurality of sixth conductive threads; and
the top and side panels being configured to be releasably electrically coupled to one another.

10. The mattress of claim 9, the side panel further comprising a second insulating interior layer located between the conductive second inner layer and the conductive second outer layer, the insulating interior layer including a flame-retardant layer and a polyester layer.

11. The mattress of claim 9, the mattress encasement further including a bottom panel coupled to the second side of the inner foam layer, the bottom panel including:
an electrically conductive third inner layer comprising a plurality of seventh conductive threads woven in two differing and intersecting directions;
an electrically conductive, antibacterial third outer layer comprising a plurality of eighth conductive threads aligned substantially parallel to one another; and
a third insulating interior layer,
the top, side, and bottom panels being electrically coupled to one another.

12. The mattress of claim 11, the bottom panel being configured to electrically couple to the side panel by the second conductive edge ribbon.

13. The mattress of claim 11, the bottom panel further including a third conductive edge ribbon configured to electrically couple to the conductive third inner layer and the conductive third outer layer, and a second mechanical fastener configured to releasably electrically couple the bottom panel and the side panel.

14. The mattress of claim 8, wherein the plurality of third conductive threads of the first conductive edge ribbon are women in a crisscross pattern.

15. The mattress of claim 11, wherein the insulating interior layer of the top panel includes a flame-retardant layer, a top foam layer, and a bottom foam layer and the third insulating interior layer of the bottom panel includes a flame-retardant layer and a polyester layer.

16. The mattress of claim 11, wherein the grounding cable includes a first end that is connectable to and detachable from the grounding terminal and a second end that is configured to electrically couple the grounding terminal to earth ground.

17. The mattress of claim 16, wherein the second end is coupled to an adapter that is configured to plug into an electrical wall outlet to electrically couple the grounding terminal to earth ground.

18. The mattress of claim 17, wherein the third plurality of conductive threads of the first conductive edge ribbon is at least one of silver threads and carbon threads.

19. A method of electrically grounding a mattress, the mattress having an inner foam layer, the inner foam layer having a first side and a second side that is opposite the second side, a side panel, and a top panel disposed proximate the side panel, the top panel being coupled to the first side of the inner foam layer, the top panel having:
an electrically conductive first inner layer comprising a plurality of first conductive threads woven in two differing and intersecting directions;
at least one insulating interior layer disposed on the conductive first inner layer;
an electrically conductive first outer layer disposed on the at least one insulating interior layer, the conductive first outer layer:
not being in direct physical contact with the conductive first inner layer; and
comprising a plurality of second conductive threads aligned substantially parallel to one another;
a first conductive edge ribbon configured to electrically couple the conductive first inner layer with the conductive first outer layer, the first conductive edge ribbon having a plurality of third conductive threads;
a grounding terminal attached to the conductive first outer layer;
a grounding cable that is electrically coupled with the grounding terminal, the grounding cable being configured to electrically ground the conductive first inner layer, the first outer layer, and the conductive edge ribbon; and a first mechanical fastener configured to releasably couple the top panel and the side panel, wherein when in a first configuration the first mechanical fastener electrically couples the top panel with the side panel and when in a second configuration the top panel and the side panel are not electrically coupled; and the method comprising:

physically contacting a conductive first outer layer of the top panel;

electrically coupling the conductive first outer layer of the top panel the conductive first inner layer of the top panel;

electrically coupling the conductive first outer layer of the top panel and the conductive first inner layer of the top panel to a conductive edge ribbon;

electrically coupling the conductive first outer layer of the top panel, the conductive first inner layer of the top panel, and the conductive edge ribbon to earth ground; and electrically coupling the first mechanical fastener to the top panel and the side panel, wherein when in a first configuration the first mechanical fastener electrically couples the top panel with the side panel and when in a second configuration the top panel and the side panel are not electrically coupled.

20. The method of claim 19, wherein the mattress further includes a mattress encasement with a bottom panel; and the method further comprising electrically coupling the conductive first outer layer of the top panel, the conductive first inner layer of the top panel, and the conductive edge ribbon of the top panel to an outer layer of a bottom panel of the mattress encasement and an inner layer of the bottom panel of the mattress encasement.

* * * * *